United States Patent [19]

Reusch et al.

[11] Patent Number: 5,266,422
[45] Date of Patent: Nov. 30, 1993

[54] BRANCHED POLYHYDROXYALKANOATE POLYMER SALT ELECTROLYTIC COMPOSITIONS AND METHOD OF PREPARATION

[75] Inventors: Rosetta N. Reusch; William H. Reusch, both of Okemos, Mich.

[73] Assignee: Board of Trustees operating Michigan State University, East Lansing, Mich.

[21] Appl. No.: 993,701

[22] Filed: Dec. 21, 1992

[51] Int. Cl.$^5$ ............................................. H01M 6/18
[52] U.S. Cl. .................................... 429/192; 429/191
[58] Field of Search ................ 429/192, 191, 122, 188

[56] References Cited

U.S. PATENT DOCUMENTS 5,187,032  2/1993  Sasaki et al. .................... 429/192

OTHER PUBLICATIONS

MacCallum, J. R. and Vincent, C. A., eds., Polymer Electrolyte Reviews—1, Elsevier Applied Sci., N.Y. (1987).
Gray, F. M., Solid Polymer Electrolytes VCH, pp. 1-33 (1992).
Cowie, J. M. G., Polymer Electrolyte Reviews—I, Eds., J. R. MacCallum and C. A. Vincent, Elsevier Applied Science, New York, N.Y., pp. 69-101 (1987).
Watanabe, M., M. Togo, K. Sanui, N. Ogata, T. Kobayashi, and Z. Ohtaki, Macromolecules, 17:2908-2912 (1984).
Anderson, A. J. and Dawes, E. A., Microbiol. Rev., 54:450-472 (1990).
Lageveen, R. G., Huisman, G. W., Preusting, H., Ketelaar, P., Eggink, G., and Witholt, B., Appl. Environ. Microbiol., 54:2924-2932 (1988).
Holmes, P. A., "Developments in Crystalline Polymers—2", (D. C. Bassett, ed.), Elsevier Applied Science, N.Y., pp. 1-65 (1988).
Marchessault, R. H., and C. J. Monasterios, Biotechnology and Polymers, (Ed. C. G. Gebelein), Plenum Press, N.Y., pp. 47-52 (1991).
Preusting, H., A. Nijenhuis and B. Witholt, Macromolecules, 23:4220-4224 (1990).
Slater, S., et al., Applied and Environmental Microbiology, Apr. 1992, pp. 1089-1094.
Poirier, Y., et al., Science, vol. 256, 520-522, Apr. 24, 1992.

*Primary Examiner*—John S. Maples
*Attorney, Agent, or Firm*—Ian C. McLeod

[57] ABSTRACT

Compositions and method for providing a solid conductive electrolyte composition containing a polyhydroxyalkanoate (PHA) and a salt of a conductive metal are described. The PHA is biodegradable and biocompatible and provides a basis for batteries which are more environmentally degradable. Naturally occurring polymers including polyhydroxybutyrate (PHB) and polyhydroxyvalerate (PHV) can be used to prepare the compositions.

38 Claims, 3 Drawing Sheets

BRANCHED POLYHYDROXYALKANOATE POLYMER SALT ELECTROLYTIC COMPOSITIONS AND METHOD OF PREPARATION

GOVERNMENT RIGHTS

This application was made with Government support under Grant No. NIH RO1GM33375 awarded by the National Institute of Health. The Government has certain rights in the invention.

BACKGROUND OF THE INVENTION (1) Field of the Invention

The present invention relates to solid conductive electrolyte compositions incorporating a branched polyhydroxyalkanoate (PHA) polymer and a salt of a conductive metal and to a method for producing such compositions. In particular, the present invention relates to the use of polyhydroxyalkanoates (PHA) in such compositions which are polymers occurring in nature and thus biodegradable.

(2) Prior Art

Polymeric electrolytes are of interest as alternatives to liquid for use in batteries and other applications because they do not leak, they tolerate volume changes, and their malleability permits great flexibility in battery design (MacCallum, J. R. and Vincent, C. A., eds Polymer Electrolyte Reviews—1, Elsevier Applied Science, N.Y., pp. 1-21 (1987); and MaoCallum, J. R. and Vincent, C. A., eds Polymer Electrolyte Reviews -2, Elsevier Applied Science, N.Y., pp. 23-37 (1989)). The most widely studied materials for this purpose have been polyethers, in particular poly(ethylene oxide) (PEO) and poly(1,2-propylene oxide) (PPO).

Conductivity in ionic polymers is restricted to the amorphous phase above the glass transition temperature (Tg) (Gray, F. M. "Solid polymer electrolytes" VCH, pp 1-33 (1992)), because, although the polymer solvent is immobile in the macroscopic sense, ionic conductance results from local motions of the polymer segments. Polymers suitable for the preparation of solid electrolytes should have the following features: 1) atoms or groups of atoms containing electron pairs with a donor power strong enough to coordinate a metal cation; 2) a suitable distance between the coordinating centers to optimize the formation of multiple intrapolymer ion bonds with cations; and 3) low barriers to bond rotation to facilitate segmental motion of the polymer chain. Good mechanical properties such as malleability are also important.

In the case of polyethers, polyethylene oxide —(C—C—O)— has an optimal backbone. Polyethers in which the distance between oxygens in the backbone is less, e.g. polymethylene oxide —(C—O)— or greater e.g. 1,3 polypropylene oxide —(C—C—C))— do not significantly dissolve salts. Changes in the pendant substituents e.g. 1,2-polypropylene oxide —(C(C)—CO)— form polymer electrolytes with somewhat poorer conductance because of the stearic hindrance introduced by the methyl substituent (Cowie, J. M. G. In "Polymer electrolyte reviews-I" (eds. J. R. MacCallum and C. A. Vincent) Elsevier Applied Science, New York, N.Y., pp 69-101 (1987); and MacCallum, J. R. and C. A. Vincent. In "Polymer electrolyte reviews-I" (eds. J. R. MacCallum and C. A. Vincent) Elsevier Applied Science, New York, N.Y. pp 23-37 (1987)).

Synthetically produced, non-branched polyesters may also form conducting salt complexes. Poly-β-propiolactone (Cowie, J. M. G. In "Polymer electrolyte reviews-I" (eds. J. R. MacCallum and C. A. Vincent) Elsevier Applied Science, New York, N.Y., pp 69-101 (1987)) complexes with lithium perchlorate had conductivity rivaling that of the polyethers (Watanabe, M., M. Togo, K. Sanui, N. Ogata, T. Kobayashi, and Z. Ohtaki. Macromolecules 17:2908-2912 (1984)). There has been little commercial interest in polyesters becaus they are poorer electron donors and they are more difficult and expensive to synthesize. The backbone of PPL —(O—C—C—CO)— is identical to that of the poly-β-hydroxyalkanoates (PHA) —(O—C(C)—C—CO)— which are a family of natural polyesters produced by microorganisms. Naturally occurring PHAs are optically active (R) polyesters that are best known as intracellular reserves in bacteria (Anderson, A. J. and Dawes, E. A., Microbiol. Rev. 54:450-472 (1990)). Microorganisms are capable of producing a wide range of polymers and copolymers based on 3-hydroxypropionic acid substituted with various lower alkyl groups in the 3-position (or β-position) which can be used to prepare polymer electrolytes with different mechanical and thermal properties. The most common homopolymer is poly-3-hydroxybutyrate (PHB) which has a methyl group in the 3-position, but polymers containing C2 to C10 alkyl side groups, alkenyl side groups, and 4-hydroxy acids can also be produced (Holmes, P.A., "Developments in Crystalline Polymers - 2" (D. C. Bassett, ed) Elsevier Applied Science, N.Y., pp 1-65 (1988); Anderson, A. J. and Dawes, E. A., Microbiol. Rev. 54:450-472 (1990); and Lageveen, R. G., Huisman, G. W., Preusting, H., Ketelaar, P., Eggink, G., and Witholt, B., Appl. Environ. Microbiol. 54:2924-2932 (1988); Marchessault, R. H. and C. J. Monasterios. In "Biotechnology and polymers" (ed. C. G. Gebelein) Plenum Press, New York pp 47-52 (1991)). Some organisms, e.g. *Pseudomonas oleovorans*, are able to accumulate PHAs with longer side-chains including unsaturated ones when the appropriate substrate is added to the culture medium (Preusting H., A. Nijenhuis, and B. Witholt. Macromolecules 23:4220-4224 (1990)). The homopolymers and copolymers are all biodegradable. Their rate of chemical hydrolysis at neutral pH is extremely slow, but microorganisms produce both specific and non-specific enzymes capable of degrading the polymers rapidly to non-toxic monomers. The monomers are all optically active in the R absolute configuration. PHB can be produced by the microorganisms from carbon substrates as diverse as glucose, ethanol, acetate, alkanes, alkenes, methane and even gaseous mixtures of carbon dioxide and hydrogen. The polymer exists as discrete granules within the cell cytoplasmic space and can represent up to 80% of the dry cell weight. After extraction and purification, PHB behaves as a normal crystalline thermoplastic with a melting point around 180° C. (the other PHAs have lower melting points —down to 50° C.) and it can be processed by conventional extrusion and molding equipment.

These naturally occurring polyesters have been exploited commercially as biodegradable thermoplastics. There is no mention of the use of these polymers as electrolytes in the PHA literature (Holmes, P.A. In "Developments in Crystalline Polymers —2" (D. C. Bassett, ed) Elsevier Applied Science, New York, pp 1-65 (1988)) or in the literature on polymer electrolytes.

Industrial processes have been developed which will make the PHAs at competitive cost. At present, PHB and the other naturally produced polymers and copolymers produced in some bacteria and archaebacteria are the best sources of the polymers. The genes encoding PHA synthesis can be transferred to other organisms and PHAs can then be produced in the recipients (Slater, S. et al, Applied and Environmental Microbiol. 58, 1089–1094 (1992) and Poirier, Y. et al, Science 256 520–522 (1992)). Synthetic routes to the branched PHA's are difficult and expensive. The natural polymers can be mixtures of branched chain polymers which can make them more amorphus. The mixture is dictated by the growth medium used to feed the microorganisms. Generally the Tg to Tm range is greater for mixtures.

OBJECTS

It is therefore an object of the present invention to provide novel branched polyhydroxyalkanoate (PHA) and metal salt compositions which are useful in batteries and the like. In particular, it is an object of the present invention to provide such polymers from natural sources, particularly bacteria and archaebacteria, for use in such compositions. Further, it is an object of the present invention to provide a method for forming the compositions. Further, it is an object of the present invention to provide compositions, wherein the branched polyhydroxyalkanoates are biodegradable when exposed to the environment. Further still, it is an object of the present invention to provide compositions which are easy to prepare. These and other objects will become increasingly apparent by reference to the following description and the drawings.

DESCRIPTION OF PREFERRED EMBODIMENTS

Figure 1:
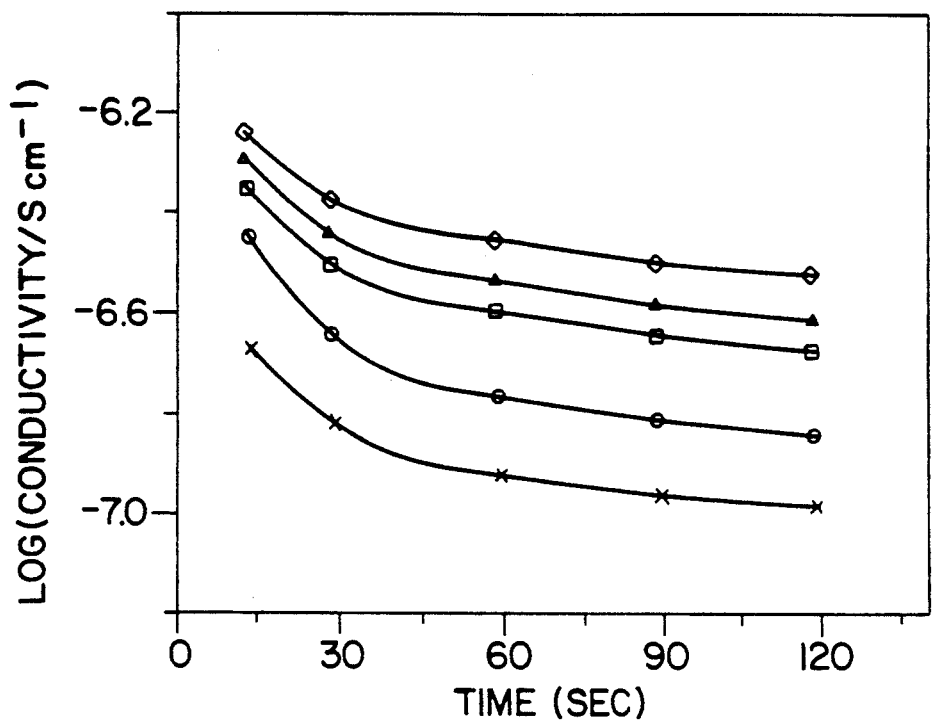
FIG. 1 is a graph showing time dependence of dc conductivity for PHB/LiCO$_4$ complexes.

The present invention relates to a solid conductive electrolyte composition which comprises in admixture: a polyhydroxyalkanoate polymer having repeating units selected from the group consisting of the formula:

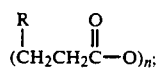

and

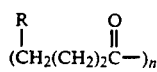

wherein R is selected from the group consisting of a lower alkyl and a lower alkenyl containing 1 to 10 carbon atoms and n is a number which produces a molecular weight between about 10$^4$ and 10$^6$; and a salt of a conductive metal in an amount which allows the composition to be conductive, wherein the mole ratio of polymer to salt is between about 20 to 1 and 5 to 1.

Further the present invention relates to a method for providing a solid conductive electrolyte composition as a conductor, the improvement which comprises providing a polyhydroxyalkanoate polymer having repeating units selected from the group consisting of the formula:

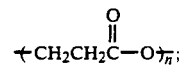

and

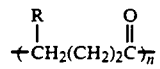

in admixture with the salt, where R is a lower alkyl and a lower alkenyl containing 1 to 10 carbon atoms and n is a number which produces a molecular weight between about 10$^4$ and 10$^6$.

Polyhydroxyalkanoates (PHAs) preferably of natural origin, may be used to prepare solid polymer electrolytes that are biodegradable and biocompatible. The naturally occurring PHAs can be a mixture of high molecular weight and low molecular weight polymers since it is difficult to form films from low molecular weight polymers. The family of PHAs produced by microorganisms includes homopolymers and copolymers that encompass a wide range of crystallinities and glass temperatures which may be used to make polymer/salt solvates that exhibit good conductivity and mechanical characteristics over a broad range of temperatures. In addition, the natural polyesters can be added to synthetic polymer electrolytes to prepare ion-conducting materials with improved mechanical characteristics, conductivity and biodegradability. The PHAs can also be cross-linked with various cross-linking agents, particularly diols, to make them more amorphous.

The present invention particularly describes the use of polyhydroxyalkanoates (PHAs) from natural sources for the preparation of polymer electrolytes and describes methods for preparing them. An important application of these materials is for high-energy-density batteries, e.g. solid polymer electrolyte (SPE) lithium batteries.

The present invention demonstrates the ability of the PHAs to form solid polymer electrolytes. The use of PHAs is an improvement over polyether solvates because their biodegradability satisfies current concerns over the environmental pollution caused by discarded plastics, and their biocompatability is congruous with certain medical uses, e.g. in pacemakers. The natural polyesters can also be used to improve the mechanical characteristics of synthetic polymer electrolytes, and/or to increase their conductivity, and/or to improve their biodegradability. The availability of these natural polymers with a broad range of crystallinity and glass temperatures (Tg) makes it possible to design conductive films for use at specific temperatures, the temperature range bound at the lower end by the lowest Tg obtainable and by the melting temperature of PHB (175°-180° C.) at the high end.

The conductivities of PHA/salt complexes, as for other polymer electrolytes, are dependent on the molecular weight, monomer composition, and chain heterogeneity of the polymer, and the nature and molar ratio of the salt. Conductivity of PHA solvates may be further enhanced by the addition of low molecular weight plasticizers or by mixing the polyesters with other solvating polymers, such as PEO.

Figure 2:
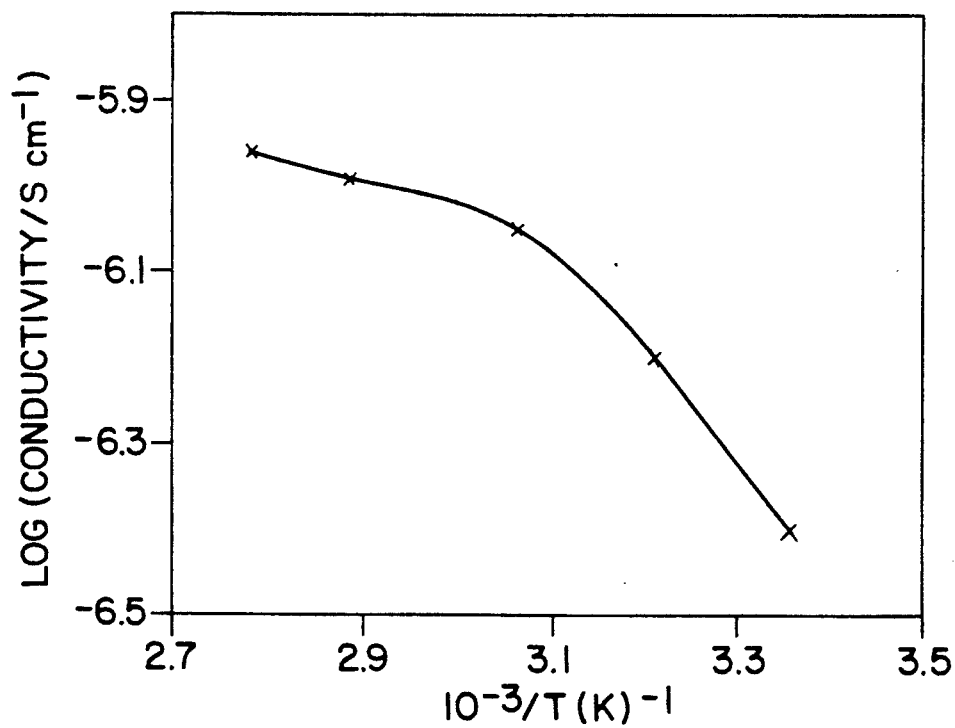
FIG. 2 is a graph showing temperature dependence of conductivity for PHB/LiClO$_4$ complexes.
Figure 3:
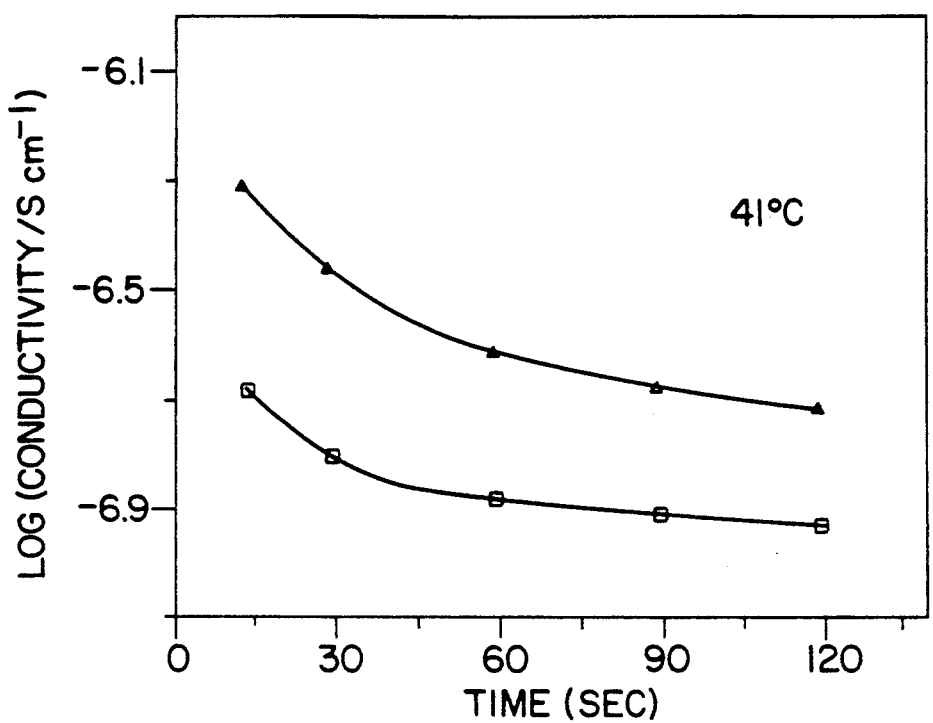
FIG. 3 is a graph showing effect of molecular weight on conductivity Δ PHB av MW 437,000; □ PHB av MW 30,000.
Figure 4:
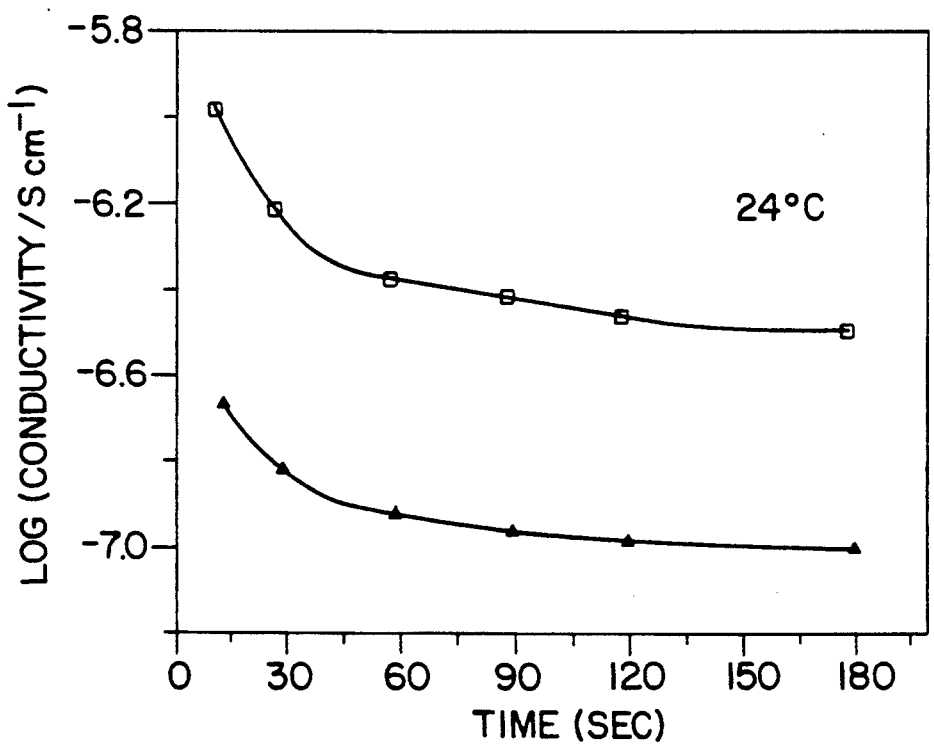
FIG. 4 is a graph showing effect of composition on conductivity □PHB/PHV, 93%/7%; ΔPHB/PHV, 76%/24% MW >600,000.

Ion transport in polymer electrolytes occurs primarily within amorphous regions and is aided by high segmental mobility of the polymer backbone corresponding to low Tg. High molecular weight PHBs (>150,000 MW) are brittle with a Tg of −5° to 10° C. (The Tg and brittleness is shown by Holmes, P. A., in "Developments in Crystalline Polymers-2" (D. C. Bassett, ed.) Elsevier Applied Science, NY. pp 1-65 (1988)). As shown by the following Examples, PHBs form salt complexes with low conductivity at temperatures below 100° C. ($<10^{-7}$ S/cm for 0.6 mm pellets); however, the conductivity is improved ten fold by the addition of low molecular weight plasticizers such as propylene carbonate, as shown in FIGS. 1 and 2 and severalfold by lowering the molecular weight, as shown in FIG. 3. PHB/PHV copolymers (PHV is poly-$\beta$-hydroxyvalerate) are more amorphous so that even high MW polymers (>600,000) form salt complexes with conductivities in the range $10^{-7}$ to $10^{-4}$ S/cm without plasticizers, as shown in FIG. 4. The conductance of the PHB/PHVs of lower average molecular weight can be still higher. Higher conductance from PHAs can be achieved with longer side-chains (C3-C10), branched chains, or unsaturated side chains, which have greatly decreased crystallinity and significantly lower Tgs (Marchessault, R. H. and Monasterios, C. J., In "Biotechnology and Polymers" (C. G. Gebelein, ed) pp 47-52 (1991)).

With the processing technology of the present invention, polymeric films can be made that are 50 to 100$\mu$m thick. The preferred range is between about 10 and 100 $\mu$m thick. It is well known to practitioners in the field using polyethers that decreasing the thickness of the film increases conductivity, and that conductance at acceptable levels for battery technology can be realized by using thin films with large surface area. The thin films are provided between an anode and a cathode of the battery.

According to the present invention a biodegradable solid polymer electrolyte is comprised of a mixture of: (a) one or more poly-$\beta$-hydroxyalkanoate esters (PHAs), preferably of natural origin; and (b) one or more ionic salts. The material may optionally contain in addition (c) and/or (d), where (c) one or more low mass plasticizers and (d) is one or more synthetic ion-solvating polymers.

The PHAs (a) can have a narrow range of molecular weights or by mixtures of diverse molecular weights; can have a variety of side-chains, can be homologous or heterologous with regular or random distribution of side-chains; or can be mixtures of these.

Suitable cations in the ionic salt (b) are metal ions or stable cationic complex ions. Preferred cations are the alkali metals, especially $Li^{+1}$ and $Na^{+1}$; the alkaline earths, especially $Ca^{2+}$ and $Mg^{2+}$, or $Zn^{+1}$, $Ni^{+2}$, $Co^{30}$ 2; and ammonium and alkyl or aryl ammonium cations. The anion may be any compatible anion, particularly those found in electrolytes such as ClC, $CF_3SO_3$, $I^-$, $SCN^{-1}$, $(C_6H_3)_4B^{-1}$, $BF_4^{-1}$, $BR_4^{-1}$, $CF_3CO_2^{-1}$ or polymeric anions such as $CF_3(CF_2)_aCO_{2-1}$ and $(CF_2)_nSO_3^{-1}$.

Plasticizers (c) are preferably also ion-solvating and low molecular weight such as the alkylene carbonates containing 3 to 4 carbon atoms such as propylene carbonate and ethylene carbonate. Other plasticizers are amyl stearate, benzyl benzoate, benzyl butyrate, butyl phthalyl butyl glycolate, n-butyl stearate, "carbitol" laurate, "carbitol" phthalate, "cellosolve" stearate, dibutyl phthalate, dibutyl sebacate, di(diethylene glycol monoethyl ether) phthalate, diethoxyethyl adipate, diethoxyethyl phthalate, diethylene glycol dipropionate, dimethoxytetraglycol,, ethylene glycol dibutyrate, glycerol tributyrate, pentaerythritol tetrabutyrate, triethyl tricarballylate, and triethylene glycol dibutyrate.

Ion-solvating polymers (d) are preferably polyethers, such as PEO and PPO. When the percentage of (a) becomes significantly less than that of (d), the invention may be considered a method to improve the mechanical properties, conductivity, biodegradability or biocompatability of the synthetic polymer electrolytes.

The relative proportion of components (a) and (b) are variable within broad limits. Preferably the PHA (a) comprises 85 to 95 mole percent and (b) salt 5 to 15 mole percent. When plasticizer (c) is present the ratios of (a), (b) and (c) are preferably 65 to 85 mole percent (a), 5 to 15 mole percent (b) and 10 to 20 percent mole percent (c). The plasticizer (c) is added primarily to facilitate the formation of films of PH homopolymer. After the film is formed, much of the plasticizer (c) is removed by heating under reduced pressure so that the amount present in the conducting film is greatly decreased, but complete removal of plasticizer (c) results in a drop in conductivity. In mixtures containing polyesters or polyethers (d) the ratios of (a), (b) and (d) are 40 to 85 mole percent (a), 5 to 15 mole percent (b) and 10 to 45 mole percent (d). Part of polymers (a) or (d) can be replaced with plasticizer (c).

The mole ratio of PHA to salt is preferably between about 20 to 1 and 5 to 1. The mole ratio of polymer to plasticizer is preferably between about 10 to 1 and 2 to 1. The ratio of polyoxyethylene polymer (PEO or PPO) is preferably between about 100 to 1 and 1 to 100. Usually the mole ratio range is between about 10 to 1 and 1 to 10.

The polymeric material may be formed by dissolving the PHA (a) and salt (b) in suitable miscible solvents and mixing the two solutions. Suitable solvents are chloroform or methylene chloride for PHAs and tetrahydrofuran for the salts (b). When plasticizer (c) or polymer (d) are present they may be added to the same or other miscible solvents. The solvent may then be removed e.g. by evaporation in an inert atmosphere or under reduced pressure. Alternatively, the salts (b) can be dissolved directly in molten PHAs (a) in an inert atmosphere or under reduced pressure. The polymeric material can then be formed into a pellet e.g. in a heated stainless steel press (75°-30° C.) which are used in forming thin films. Any volatile contaminants can then be removed by heating for instance at 50° C. at reduced pressure (1 Torr) for 1-8 hours.

Alternatively, the salt may be mixed with the PHA, and heated under a dry nitrogen stream or other nonreactive gas such as argon to the melting temperature. After the mixture becomes optically homogeneous, it is cooled to room temperature. The process can be repeated to achieve homogeneous dissolution of the salt.

The mixture may also be annealed under reduced pressure at temperatures of 50° C. to 90° C. for a period of time, or it can be heated to melting temperature and then quenched. The polymer and salt can also be mixed in a press under high pressure to form a homogeneous film.

The following Examples 1 to 4 are illustrative of the present invention.

EXAMPLE 1

A polymeric film was prepared from:
(a) 69% PHB, average molecular weight 437,000 (Sigma Chemical Company, St. Louis, MO)
10% PHB, av MW 30,000 (Polysciences, Warrington, PA) (b) 7% lithium perchlorate LiClO$_4$ (Aldrich Chemical Co., St. Louis, MO) (c) 14% propylene carbonate (Aldrich Chemical Co., St. Louis, MO)
where the percentages are in mole percent.

The lithium perchlorate (b) and propylene carbonate (c) were dissolved in tetrahydrofuran (THF) and the two PHBs (a) were dissolved in chloroform. All reagents were previously dried; the chloroform by passage through a column of activated alumina, the THF by distillation from benzophenone ketyl, the lithium perchlorate by heating at 100° C. under vacuum for 48 hours, the propylene carbonate with molecular sieve 4A (Aldrich, St. Louis, MO), and the PHBs by storage in a desiccator. The two solutions were brought to reflux temperature (60–65° C.), mixed together, and again brought to reflux temperature. A clear colorless solution was formed. The solvents were evaporated with a stream of argon gas and then remaining solvent was removed under reduced pressure to leave a uniform film of polymeric material. About 100 mg of this material was subsequently pressed between two heated (100°–130° C.) steel electrodes in a stainless steel press as described above to form a film of thickness of 600 µm.

The time dependence of conductivity for the film at various temperatures is recorded in FIG. 1, and the temperature dependence of conductivity is shown in FIG. 2. In FIG. 1, ×24° C., ○37°, □58° C., △70° C. and ◇ 86° C. As can be seen, as the temperature increases so does the conductivity.

EXAMPLE 2

Following the procedure of Example 1, polymeric films of 540 µm thickness were prepared with the following components:
Preparation 1.
  (a) 89% PHB MW 437,000
      11% LiClO$_4$
Preparation 2.
  (a) 89% PHB/PHV copolymer, av MW 650,000. PHV content 7% (Aldrich).
  (b) 11% LiClO$_4$
Preparation 3.
  (a) 89% PHB/PHV copolymer, av MW 650,000. PHV content 24% (Aldrich).
  (b) 11% LiClO$_4$ The conductivity at 41° C. is recorded for Preparations 2 and 3 in FIG. 3. In FIG. 3, □ PHB/PHV 93%/17%; △PHB/PHV 76%/24% MW >600,000. The mixture of PHV and PHB provides improved results where there is more PHV, thus indicating longer branches improve conductivity. The conductivity of preparation 1 at 41° C. Was too low for measurement ($<10^{-7}$S/cm) at this temperature. At higher temperatures Preparation 1 would be conductive.

EXAMPLE 3

Following the procedure of Example 1, polymeric films of 600 µm were prepared using the following components (where the amounts are in mole percents):
Preparation 1.
  (a) 89% PHB MW 30,000
  (b) 7% LiClO$_4$
  (c) 14% propylene carbonate
Preparation 2.
  (a) 69% PHB MW 437,000 10% PHB MW 30,000
  (b) 7% LiClO$_4$
  (c) 14% propylene carbonate
Preparation 3.
  (a) 79% PHB MW 437,000
  (b) 7% LiClO$_4$
  (c) 14% propylene carbonate The time dependence of the dc conductivity at room temperature (24° C.) of preparations 2 and 3 is shown in FIG. 4. Preparation 1 conductivity was too low for measurement ($<10^{-7}$ S/cm). In FIG. 4, △PHB ave MW 37,000, □PHB ave MW 30,000. The results show that the low molecular weight PHB significantly improves the conductivity of the film. At higher temperatures Preparation 1 would be conductive.

EXAMPLE 4

Following the procedure of Example 1, polymeric films of 750 µm were prepared from the following components (where the percentages are in mole percent):
Preparation 1
  (a) 77% PEO av MW 100,000
      15% PEO av MW 8,000
  (b) 8% LiClO$_4$
Preparation 2.
  (a) 81% PHB av MW 30,000
  (b) 8% LiClO$_4$
  (c) 11% PEO av MW 100,000
Preparation 3.
  (a) 42% PHB av MW 30,000
  (b) 14% LiClO$_4$
  (c) 44% PEO av MW 100,000

Figure 5:
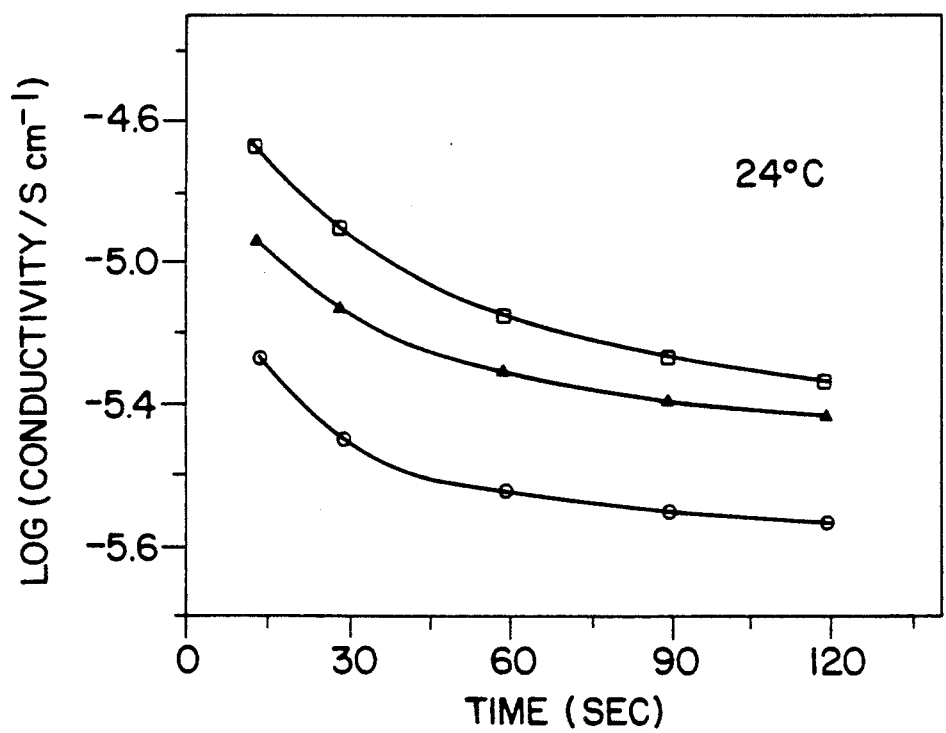
FIG. 5 is a graph showing time dependence of dc conductivity for PEO and PHB/PEO solvates of LiClO$_4$.

The time dependence of the dc conductivity at 24° C. is shown in FIG. 5. △100K PEO 18K PEO 84%/16%, ⊕30K PHB/100K PEO 80%/12%; ⊖30K PHB/100K PEO 49%/57%. The results show that PHB significantly improves the performance of PEO at high concentrations. The PHB with PEO makes a more amorphous composition.

It has been generally established that ion-conduction occurs in amorphous areas of a polymer and that the polymer solvent plays a very important role in the conduction process through local chain flexibility (Gray, F. M., "Solid polymer electrolytes" VCH pp 1–33 (1992)). Consequently, ion-conduction is restricted to temperatures above Tg (glass transition temperature) and below Tm (melting temperature). The aim of the present invention is to obtain a polyester with low crystallinity and low Tg with desirable mechanical properties (such as malleability). The great variability available in PHAs (such as different side chains, copolymers with different ratios and different molecular weight ranges), provides a large diversity of polymers with a range of Tgs and Tms from which to choose in designing polymer electrolytes that will conduct at any desired temperature range (Tg and Tm are generally discussed by Marchessault and Monasterios, Biotechnology and Polymers (Ed. C. G. Gebelein) Plenum Press, N.Y., pp. 47-52 (1991)). Added to this is the use of plasticizers—i.e. a low molecular weight, aprotic, polar molecule, such as propylene carbonate, ethylene carbonate and dimethylformamide, to improve conductance of complexes with too much crystallinity (the use of plasticizers is shown by Cowie, J. M. G., In "Polymer electrolyte reviews-I" (eds. J. R. MacCallum and C. A. Vincent) Elsevier Applied Science, New York, N.Y. pp 69-101 (1987)).

The polymer can be modified to reduce crystallinity and average molecular weight by transesterification with α, Ω-diols containing 2 to 10 carbon atoms such as triethylene glycol or tetraethylene glycol to change the direction of the polymer from head to tail to tail to head. Thus high molecular weight (300,000 Dalton) PHB can be modified to reduce crystallinity and average molecular weight by transesterification with α, Ω-diols. This has been accomplished by using triethylene glycol or tetraethylene glycol (ca. 1:50 mole ratio with PHB) in refluxing dichloroethane solution, containing concentrated sulfuric acid as a catalyst. Following a 48 hour reaction period, these solutions were washed with sodium bicarbonate solution and brine, dried over anhydrous magnesium sulfate, and evaporated to a solid residue. This modified material was dried under vacuum at 100° C. at 1 Torr for 24 hours. A H NMR spectrum of this material shows incorporation of small amounts (ca. 2 %) of the polyether linker.

EXAMPLE 5

PHB average molecular weight >300,000 (Polysciences, Warrington, PA) melting point 175°-80° C.

PHB average molecular weight 30,000 (Polysciences, Warrington, PA) melting point 165°-167° C.

PHB (300,000) treated with triethylene glycol (2% polyether linker) melting point 160°-165° C.

The decline in melting point resulting from 2% cross-linking is greater than that realized by a tenfold decrease in molecular weight. This indicates that the cross-linked polymer is more amorphous. One can reasonably expect it to form more conductive salt complexes.

It is intended that the foregoing description be only illustrative of the present invention and that the present invention be limited only by the hereinafter appended claims.

We claim:

1. A solid conductive electrolyte composition which comprises in admixture:
   (a) a polyhydroxyalkanoate polymer having repeating units selected from the group consisting of the formula:

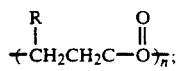

and

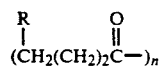

wherein R is selected from the group consisting of a lower alkyl and a lower alkenyl containing 1 to 10 carbon atoms and n is a number which produces a molecular weight between about $10^4$ and $10^6$; and (b) a salt of a conductive metal, wherein the mole ration of polymer to salt is between about 20 to 1 and 5 to 1.

2. The composition of claim 1 wherein R is both methyl and ethyl groups.

3. The composition of any one of claims 1 or 2 wherein the metal is lithium.

4. The composition of claim 1 including a plasticizer for the polymer in the composition in a mole ratio of polymer to plasticizer of between about 10 to 1 and 2 to 1.

5. The composition of claim 1 including a polyalkylene oxide polymer selected from the group consisting of polyethylene oxide and polypropylene oxide in a mole ratio of polyhydroxyalkanoate to polyoxyalkylene oxide polymer between about 100 to 1 and 1 to 100.

6. The composition of claim 1 wherein the composition contains 85 to 95 mole percent of the polyhydroxyalkanoate polymer and 5 to 15 mole percent of the salt.

7. The composition of claim 6 wherein R is selected from the group consisting of methyl, ethyl and mixtures thereof.

8. The composition of claim 7 wherein the metal is lithium.

9. The composition of claim 4 wherein the composition contains 65 to 85 mole percent of the polyhydroxyalkanoate polymer, 5 to 15 mole percent of the salt and 10 to 30 mole percent of the plasticizer.

10. The composition of claim 9 wherein R is selected from the group consisting of methyl, ethyl and mixtures thereof.

11. The composition of claim 10 wherein the metal is lithium.

12. The composition of claim 5 wherein the polyhydroxyalkanoate is between 40 to 85 mole percent, the salt is between 5 to 15 mole percent and polyalkylene oxide is between about 10 and 45 mole percent.

13. The composition of claim 12 wherein R is selected from the group consisting of methyl, ethyl and mixtures thereof.

14. The composition of claim 13 wherein the metal is lithium.

15. The composition of claim 1 wherein the polymer has been transesterified with an alpha, omega diol containing 2 to 10 carbon atoms.

16. The composition of claim 15 wherein the diol is selected from the group consisting of triethylene glycol and tetraethylene glycol.

17. In a method for providing a solid conductive electrolyte composition has a conductor, the improvement which comprises providing a polyhydroxyalkanoate polymer having repeating units selected from the group consisting of the formula:

$$\text{+CH}_2\text{CH}_2\overset{\overset{\text{O}}{\|}}{\text{C}}-\text{O+}_n;$$

and $$\text{+CH}_2(\text{CH}_2)_2\overset{\overset{\text{O}}{\|}}{\text{C}}-)_n$$

in admixture with a salt of a conductive metal, where R is a lower alkyl and a lower alkenyl containing 1 to 10 carbon atoms and n is a number which produces a molecular weight between about $10^4$ and $10^6$.

18. The method of claim 17 wherein R is both methyl and ethyl groups.

19. The method of any one of claims 17 or 18 wherein the metal is lithium.

20. The method of claim 17 including a plasticizer for the polymer in the composition in a mole ratio of polymer to plasticizer of between about 10 to 1 and 2 to 1.

21. The method of claim 17 including a polyalkylene oxide polymer in the composition selected from the group consisting of polyethylene oxide and polypropylene oxide in a mole ratio of polyhydroxyalkanoate polymer to polyoxyalkylene oxide polymer between about 100 to 1 and 1 to 100.

22. The method of claim 17 wherein the composition contains 85 to 95 mole percent of the polyhydroxyalkanoate polymer and 5 to 15 mole percent of the salt.

23. The method of claim 17 wherein R is selected from the group consisting of methyl, ethyl and mixtures thereof.

24. The method of claim 23 wherein the metal is lithium.

25. The method of claim 17 wherein the composition contains 65 to 85 mole percent of the polyalkanoate polymer, 5 to 15 percent of the salt and 10 to 30 mole percent of the plasticizer.

26. The method of claim 17 wherein R is selected from the group consisting of methyl, ethyl and mixtures thereof.

27. The method of claim 26 wherein the metal is lithium.

28. The method of claim 17 wherein the polyhydroxyalkanoate is between 40 to 85 mole percent, the salt is between 5 to 15 mole percent and the polyalkylene oxide is between about 10 and 45 mole percent.

29. The method of claim 17 wherein R is selected from the group consisting of methyl, ethyl and mixtures thereof.

30. The method of claim 29 wherein the metal is lithium.

31. The method of claim 17 wherein the polymer has been transesterified with an alpha, omega diol containing 2 to 10 carbon atoms.

32. The method of claim 31 wherein the diol is selected from the group consisting of triethylene glycol and tetraethylene glycol.

33. In a battery including a thin film of an electrolyte composition between an anode and a cathode the improvement which comprises a solid conductive electrolyte composition which comprises in admixture:

(a) a polyhydroxyalkanoate polymer having repeating units selected from the group consisting of the formula:

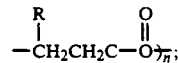

and

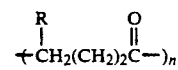

wherein R is selected from the group consisting of a lower alkyl and a lower alkenyl containing 1 to 10 carbon atoms and n is a number which produces a molecular weight between about $10^4$ and $10^6$; and (b) a salt of a conductive metal, wherein the mole ratio of polymer to salt is between about 20 to 1 and 5 to 1.

34. The battery of claim 33 wherein R is both methyl and ethyl group.

35. The battery of claim 33 or 34 wherein the metal is lithium.

36. The battery of claim 33 wherein the composition includes a plasticizer for the polymer in the composition in a mole ration of polymer to plasticizer of between about 10 to 1 and 2 to 1.

37. The battery of claim 33 wherein the composition includes a polyalkylene oxide polymer selected from the group consisting of polyethylene oxide and polypropylene oxide in a mole ratio of polyhydroxyalkanoate to polyoxyalkylene oxide polymer between about 100 to 1 and 1 to 100.

38. The battery of claim 33 wherein the polyhydroxyalkanoate polymer is naturally occurring.

* * * * *

UNITED STATES PATENT AND TRADEMARK OFFICE
CERTIFICATE OF CORRECTION

PATENT NO. : 5,266,422
DATED : November 30, 1993
INVENTOR(S) : Rosetta N. Reusch and William H. Reusch It is certified that error appears in the above—identified patent and that said Letters Patent is hereby corrected as shown below:

Column 1, line 31, "MaoCallum" should be --MacCallum--.

Column 1, line 57, "-(C-C-C))-" should be -- -(C-C-C-O)- --.

Column 1, line 59, "-(C(C)-CO)-" should be -- -(C(C)-C-O)- --.

Column 2, line 11, "becaus" should be --because--.

Column 3, line 37, "LiCO$_4$" should be --LiClO$_4$--.

Column 5, line 29, "$10^{-4}$" should be --$10^{-6}$--.

Column 5, lines 65 and 66, "Zn$^{+1}$, Ni$^{+2}$, Co$^{30}$ 2;" should be --Zn$^{+2}$, Ni$^{+2}$, Co$^{+2}$; --.

Column 5, line 68, "ClC" should be --ClO$_4$--.

Column 6, line 1, "(C$_6$H$_3$)$_4$" should be -- (C$_6$H$_5$)$_4$ -- and "BR$_4^{-1}$" should be -- BF$_4^{-1}$ --.

Column 6, line 2, "CF$_3$(CF$_2$)$_a$" should be -- CF$_3$(CF$_2$)$_n$ --.

Column 6, line 30, "PH" should be --PHB--.

UNITED STATES PATENT AND TRADEMARK OFFICE
CERTIFICATE OF CORRECTION

PATENT NO. : 5,266,422
DATED : November 30, 1993
INVENTOR(S) : Rosetta N. Reusch and William H. Reusch It is certified that error appears in the above—identified patent and that said Letters Patent is hereby corrected as shown below:

Column 7, line 52, "LiClCO$_4$" should be --LiClO$_4$--.

Column 7, line 57, "LiClCO$_4$" should be --LiClO$_4$--.

Column 7, line 61, "LiClCO$_4$" should be --LiClO$_4$--.

Column 7, line 64, "93/17%" should be --93/7%--.

Column 8, line 10, "LiCLCO$_4$" should be --LiClO$_4$--.

Column 8, line 18, "LiCLCO$_4$" should be --LiClO$_4$--.

Column 8, line 24, "MW 37,000" should be --MW 437,000--.

Column 8, line 36, "LiClCO$_4$" should be --LiClO$_4$--.

Column 8, line 39, "LiClCO$_4$" should be --LiClO$_4$--.

Col. 8, line 43, iClCO$_4$" should be --LiClO$_4$--.

Column 9, line 29, "H NMR" should be -- $^1$H NMR --.

Column 9, line 34, "175°-80°C" should be --175°-180°C--.

UNITED STATES PATENT AND TRADEMARK OFFICE
CERTIFICATE OF CORRECTION

PATENT NO. : 5,266,422    Page 3 of 4
DATED : November 30, 1993
INVENTOR(S): Rosetta N. Reusch and William H. Reusch It is certified that error appears in the above—identified patent and that said Letters Patent is hereby corrected as shown below:

Column 9, line 63 (Claim 1), " $(CH_2(CH_2)_2\overset{\overset{R}{|}}{\underset{}{C}}\overset{O}{\overset{\|}{}}-)_n$ "

should be -- $(\!\!-CH_2(CH_2)_2\overset{\overset{R}{|}}{\underset{}{C}}\overset{O}{\overset{\|}{}}-)_n$ --.

Column 10, line 2 (Claim 1), "ration" should be --ratio--.

Column 10, line 51 Claim 17), "has" should be --as--.

Column 12, line 13 (Claim 33) " $-CH_2CH_2\overset{\overset{R}{|}}{\underset{}{C}}\overset{O}{\overset{\|}{}}-O\!\!-)_n$ "

should be -- $(\!\!-CH_2CH_2\overset{\overset{R}{|}}{\underset{}{C}}\overset{O}{\overset{\|}{}}-O\!\!-)_n$ --.

UNITED STATES PATENT AND TRADEMARK OFFICE
CERTIFICATE OF CORRECTION

PATENT NO. : 5,266,422

DATED : November 30, 1993

INVENTOR(S) : Rosetta N. Reusch and William H. Reusch

It is certified that error appears in the above-indentified patent and that said Letters Patent is hereby corrected as shown below:

Column 12, line 34 (claim 36), "ration" should be --ratio--

Signed and Sealed this

Twenty-fourth Day of May, 1994

*Attest:*

BRUCE LEHMAN

*Attesting Officer*    *Commissioner of Patents and Trademarks*